March 18, 1941.  F. A. SEEDLOCK  2,235,752
TOOL FOR MAKING FILES
Filed Dec. 30, 1938

INVENTOR.
BY FRANK A. SEEDLOCK
Hull, Brock & West.
ATTORNEYS.

Patented Mar. 18, 1941

2,235,752

UNITED STATES PATENT OFFICE 2,235,752

TOOL FOR MAKING FILES

Frank A. Seedlock, Lakewood, Ohio, assignor of one-half to Edward L. Noll, Lakewood, Ohio Application December 30, 1938, Serial No. 248,548

2 Claims. (Cl. 76—21)

This invention relates to a tool for making files and has for its general object the production of a tool which is especially adapted for the manufacture of a file having a form and arrangement of teeth whereby its efficiency will be materially enhanced.

Figure 1:
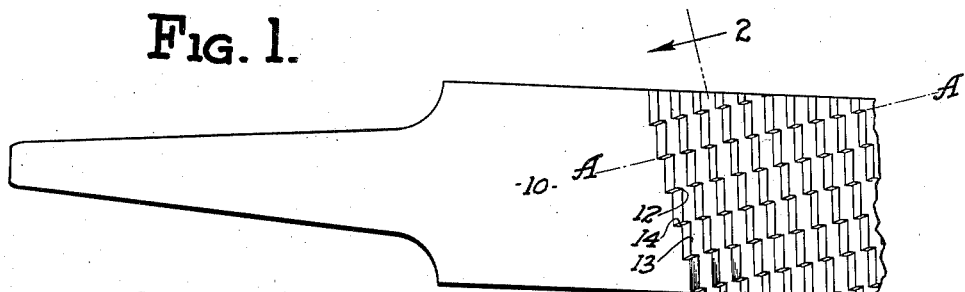
Figure 2:
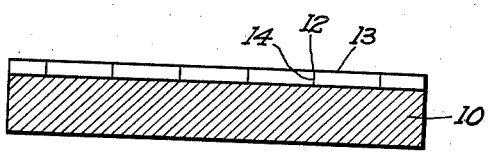
Figure 3:
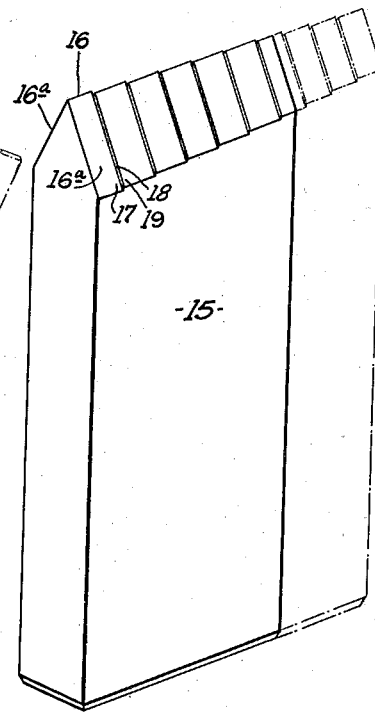
Figure 4:
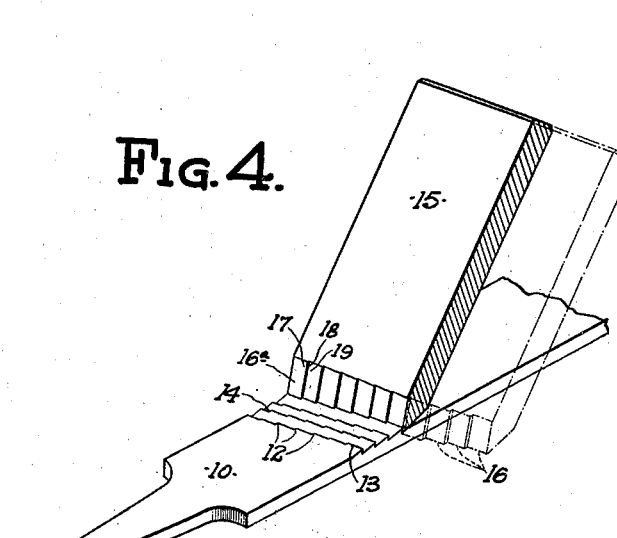
Figure 5:
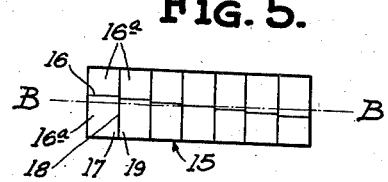

I accomplish the foregoing objects by the construction illustrated in the drawing, wherein the size of the teeth and the height and spacing of the sections of the cutting edge of the tool are greatly exaggerated, for purposes of illustration, and wherein Fig. 1 represents a plan view of a portion of a flat file provided with teeth made by my aforesaid tool; Fig. 2 a detail in section corresponding to the line 2—2 of Fig. 1; Fig. 3 a perspective view of the tool or chisel which I employ in providing a file blank with the teeth shown in Figs. 1 and 4; Fig. 4 a detail in perspective showing diagrammatically the manner in which a file blank is provided with teeth having the form and arrangement imparted thereto by my tool—the portion of the tool which is operating upon the blank being shown in full lines, the width of the tool necessary to accommodate the angular movement of the file with respect thereto being indicated by dot-and-dash lines in this view, as well as in Fig. 3; and Fig. 5 a plan view of the portion of the tool shown in full lines in Figs. 3 and 4.

Describing by reference characters the various parts shown in the drawing, 10 denotes the body of the file, the same being shown as of the "flat" type. The bodies of these files are commonly provided with teeth on opposite faces thereof; but, for the purposes of my invention, it is necessary to show only one such face as being thus toothed. 11 denotes rows of teeth extending across a flat face of the file, the rows being arranged diagonally with respect to the longitudinal axis of the file body. Each tooth in a row is provided with a chip-breaker point 12 formed at one end of a cutting edge 13 which is parallel with the face of the file body, each such cutting edge being connected by a short facet 14 with the adjacent end of the cutting edge of the next tooth in the row and with the body of the tooth below such edge. These facets extend rearwardly from the said breaker points at an angle of somewhat less than 90° with respect to the bodies of the teeth which they respectively connect.

As will appear more particularly from Fig. 1, the chip-breaker points of the teeth in the various rows are staggered, being preferably arranged along lines A—A which are inclined with respect to the longitudinal axis of the file.

The teeth are preferably shaped and arranged in the manner shown and described by means of a tool 15 of the chisel type which, in the operation of the machine for forming the files, is reciprocated toward and from the file blank thereneath, the latter being intermittently advanced after disengagement of the tool therewith, whereby the rows of teeth are formed. It will be noted that the cutting edge of the tool and the direction of travel of the file blank are so correlated that the rows of teeth produced by their joint action will extend across the file at the desired angle with respect to the axis of the latter. For the purpose of giving to the rows of teeth the particular shape desired, the cutting edge of the tool 15 is provided with steps, each step having itself a cutting edge 16 formed at the ends of reversely beveled surfaces 16a extending from opposite sides of the tool body and each such step being connected at one end 17 by a facet 18 with the adjacent end 19 of the step next adjacent thereto.

It will be noted that the cutting edges 16 are all of the same height and that they are stepped back progressively from one end of the operating portion of the tool to the other end of such portion, the stepping back involving the use of facets 18 which connect the adjacent ends of the successive cutting edges 16 and which extend at the same angle with respect to the cutting edges which they connect as do the facets 18 with respect to the cutting edges of the file teeth which they connect. It will be noted further that the composite cutting edge of the tool, which is provided by the cutting edges 16, extends diagonally from end to end of the cutting portion of the tool with respect to a plane extending through the longitudinal axis of the tool midway between the parallel sides thereof, as will be apparent more particularly from an inspection of Figs. 4 and 5, on the latter of which figures the line B—B represents the end of such a plane.

A file produced by the use of a tool such as described is provided with staggered teeth, the cutting points or chip breakers of which are also staggered and are preferably arranged along lines extending diagonally with respect to the longitudinal axis of the file body, as indicated at A—A on Fig. 1. A file so constructed is more efficient than any other file of its type with which I am familiar, because of the sharpness of the cutting points of the teeth which, together with their staggered arrangement, enables them to function effectively as chip breakers. Furthermore, I am enabled to produce such files by a single tooth-cutting operation, said operation including the feeding of the file blank beneath the special reciprocating tool 15 until a sufficient area of the blank shall have been formed into teeth by the tool. No further operation is necessary in order to provide the shape of the teeth nor the staggered arrangement of the same longitudinally of the body of the file.

Having thus described my invention, what I claim is:

1. A reciprocable tool of the chisel type for forming rows of stepped teeth in a file body, said tool having an operating end consisting of a plurality of cutting edges each formed at the outer end of reversely beveled surfaces, the cutting edges being of the same height and being parallel to one another and being stepped back laterally successively from one end of the composite cutting edge of the tool to the other.

2. In a tool constructed as set forth in claim 1, the tool having parallel sides from which the beveled surfaces project and the cutting edges being each parallel with said sides.

FRANK A. SEEDLOCK.